Patented May 18, 1943

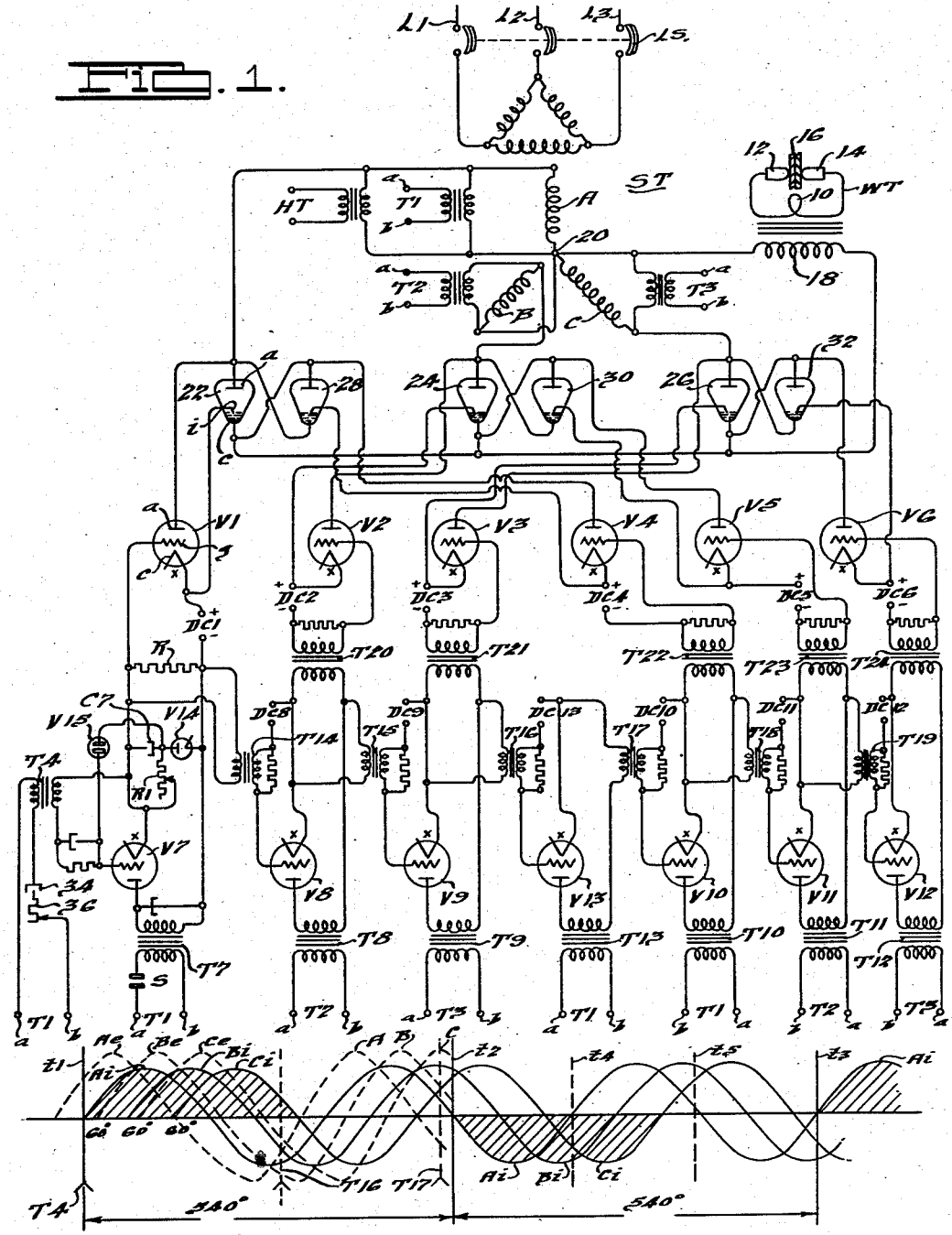

2,319,524

UNITED STATES PATENT OFFICE 2,319,524

TIMING CONTROL SYSTEM

Gustav E. Undy, Detroit, Mich., assignor to Weltronic Corporation, Detroit, Mich., a corporation of Michigan Application February 27, 1941, Serial No. 380,954

15 Claims. (Cl. 250—27)

The present invention relates to electrical control systems and, as herein disclosed, is specifically directed to the provision of improved means for practicing the system for electric welding disclosed and claimed in the co-pending application of the present applicant and Chester F. Leathers, Serial No. 380,830, filed February 27, 1941. In certain of its aspects, the present invention is an improvement upon the invention described and claimed in the co-pending application of the present applicant, Serial No. 374,951, filed January 17, 1941.

The principal objects of the present invention are to provide a control system of the above generally indicated character, which is simple in arrangement, reliable in operation, and which enables the delivery to single phase work circuits of balanced current components drawn from a multiphase system; to provide such a system employing a plurality of sequentially operated control valves which function to control load rectifiers in such relation as to deliver alternately opposite impulses of load current, each made of balanced components drawn from a multiphase system; and to provide such a system characterized as effective to deliver one or more full cycles of load current, each consisting of a pair of successive, opposite impulses; and to provide such a system wherein a starting device causes the delivery to the work circuit of a predetermined number, one or more, of impulses of one polarity and an equal number of impulses of opposite polarity.

With the above, as well as other and more detailed objects in view, which appear in the following description and in the appended claims, preferred but illustrative embodiments of the invention are shown in the accompanying drawing, in which:

Figure 1 is a diagrammatic view of circuits embodying the invention; and

Figure 2 is a diagrammatic view illustrative of current conditions.

It will be appreciated from a complete understanding of the present invention that, in a generic sense, the improvements thereof may be utilized for various specific purposes, and that various changes in the arrangement of parts may be made. For reasons which will be apparent to those skilled in the welding art, the present system has particular value and utility in the welding field, and is so disclosed herein.

Referring particularly to Fig. 1, the secondary winding 10 of the illustrative welding transformer WT is connected in a local circuit, which includes the illustrative welding electrodes 12 and 14, between which the work 16 to be welded may be clamped. As will be understood, suitable means may be provided to control the clamping pressure between the electrodes 12 and 14. One terminal of the primary winding 18 of the welding transformer WT is connected to the center point 20 of the star connected secondary winding of the three-phase supply transformer ST. The other terminal of the primary winding 18 is connected to the cathodes of a series of rectifiers 22, 24 and 26, and is connected to the anodes of a cooperating series of rectifiers 28, 30 and 32. The rectifiers 22 and 28 are reversely connected with respect to each other and are individual to the secondary winding A of the supply transformer. The other pairs of rectifiers 24—30 and 26—32 are correspondingly connected, and are individual, respectively, to the secondary phases B and C of the supply transformer. As is indicated, the secondary phase B is reversely connected, so that currents and voltages in the several phases A, B and C are displaced 60 electrical degrees apart, in the relation indicated in Fig. 2, in which figure the correspondingly designated full line curves $Ai$, $Bi$ and $Ci$ represent load current conditions. The dotted line curves $Ae$, $Be$ and $Ce$ represent voltage conditions in the several phases.

The primary winding of the supply transformer is connected in delta and is supplied with current from illustrative line conductors L1, L2, and L3. A usual line switch LS is interposed between the source of supply and the primary of the welding transformer. Preferably, and in order to insure a more uniform balance between the loads on the respective phases of the source, the magnetic circuit of each primary winding and its cooperating secondary winding are magnetically independent of the magnetic circuits for the other primary and secondary windings.

In a generic sense, the rectifiers 22 through 32 can be of any usual gaseous discharge type, but may be and are herein illustrated as being of the type known commercially under the tradename "Ignitron." As will be understood, such rectifiers comprise an anode $a$, a reconstructing type cathode $c$ of mercury or the like, and an igniter or control electrode $i$, which is permanently immersed in the cathode. Such devices have the characteristic of being normally non-conducting. If, however, a critical igniting potential is applied between the igniter $i$ and the cathode $c$ at a time when the anode $a$ is positive with respect to the cathode $c$, the device becomes conducting and remains so for the balance of the corresponding half cycle of current flow. At the conclusion of the just-mentioned half cycle of current flow, the gaseous atmosphere within the rectifier tends to rapidly become deionized, and if the application of a positive potential between the anode and the cathode is delayed sufficiently long to permit a necessary degree of deionization, the rectifier can only be rendered conducting again by applying the critical potential between the igniter and the cathode. Approximately 30 electrical degrees are usually regarded as a sufficient deionizing interval for rectifiers having capacities suitable for welding purposes, and the present control system is so arranged as to delay the re-application of a positive potential to the anode of each rectifier after the conclusion of a conducting half cycle thereof, for periods sufficiently long to insure complete deionization thereof.

As is described in more detail below, the rectifiers 22 through 32 are fired in the order 22, 24, 26, 28, 30 and 32, and this firing action is controlled by a series of firing valves V1, V2, V3, V4, V5, and V6, which are individual, respectively, to the just-mentioned rectifiers. The actuation or firing of the valves V1 through V6, in turn, is controlled by a corresponding series of control valves V7, V8, V9, V10, V11, and V12, and by an intermediate or bridging control valve V13. The valves V1 through V13 may be and preferably are of a usual gas filled type, each having an anode $a$, a cathode $c$ and a grid or control electrode $g$. As will be understood, these valves are normally non-conducting. If, however, a critical potential is applied to the grid $g$ at a time when the anode of the corresponding valve is positive, to a predetermined degree, with respect to the cathode, the valve becomes conducting and remains so for the balance of the corresponding half cycle of current flow. The valves V1 through V6 and V8 through V13 are rendered normally non-conducting by applying negative biases to the grids thereof, and to simplify the drawing, the means for applying such biases are indicated in the drawing by the reference characters DC1 through DC6, and DC8 through DC13. The just-mentioned biasing means may take any usual form.

The remaining control valve V7 is not provided with negative grid biasing means, but the plate circuit of this valve is maintained in a normally de-energized condition by the normally open switch S, described below. The grid potential of the valve V7 is controlled by a transformer T4, which may be and preferably is of the peaking type. The primary circuit of the transformer T4 is provided with conventional phase shifting elements, illustrated as comprising a condenser 34 and a variable resistor 36, and is supplied with power from a control transformer T1, the primary winding whereof is connected across the secondary transformer phase A. The terminal connnections between transformers T1 and T4 are indicated by the reference characters $a$ and $b$. The valve V7 is also provided with a blocking condenser C7, in accordance with the disclosure of said copending application, and with associated control elements comprising the auxiliary rectifier V14 and a usual discharge valve V15.

The plate circuit of valve V7 is supplied with current from the previously mentioned transformer T1, and the plate circuits of valves V10 and V13 are also supplied from transformer T1. The plate circuits of valves V8 and V11 are supplied from a similar control transformer T2, the primary winding whereof is connected across the secondary phase B, and valves V9 and V11 are supplied with current from a similar control transformer T3, the primary winding whereof is connected across the secondary phase C.

The valves V8, V9, V13, V10, V11 and V12 are sequentially rendered conducting after valve V7 is rendered conducting, each said valve being rendered conducting as a consequence of the conducting condition of the preceding valve in the series, and for this purpose additional control transformers T14 through T19 are provided.

It is thought that the remaining details of the invention may best be understood from a description of the operation thereof. Assuming it is desired to condition the system for operation, the line switch LS may be closed, which thereupon connects the primary winding of the three-phase transformer ST to the line conductors L1, L2, and L3. This action energizes the secondary windings A, B and C. The winding A energizes the control transformer T1 and the usual heater transformer HT, the winding B energizes the control transformer T2, and the winding C energizes the control transformer T3. The windings A, B and C further apply potentials across the associated pairs of rectifiers, which actions are, however, without effect since such rectifiers are in a non-conducting condition, and consequently no current is delivered to the welding transformer WT.

The energization of the heater transformer HT applies heating current to the cathodes of the valves V1 through V14, which relation is indicated by the reference character $x$ applied to the secondary terminals of the transformer HT and to the cathodes of the just-mentioned valves. This action, however, does not render any of valves V1 through V6 and valves V8 through V13 conducting, because of the previously mentioned negative grid biases applied thereto by the biasing means DC1, etc.

The energization of control transformer T2 energizes the plate transformers T8 and T11 associated with valves V8 and V11, and the energization of control transformer T3 correspondingly energizes the plate transformers T9 and T12 associated with valves V9 and V12. These actions are, however, without effect in view of the negative grid biases applied to these valves, as aforesaid. The polarities of the energizing potentials are indicated by the reference characters $a$ and $b$ applied to the respective transformer terminals.

The energization of control transformer T1 prepares a circuit for the plate transformer T7, which circuit is, however, interrupted at the now open contact members of the starting switch S, and also completes a circuit for the plate transformers T10 and T13, associated with valves V10 and V13. These valves are, however, maintained in a non-conducting condition by the aforesaid negative grid biases.

The energization of control transformer T1 also energizes the peaking transformer T4, and it will be understood, therefore, that at a critical stage, relative to each half cycle of the voltage across the secondary phase A, transformer T4 develops its maximum or critical potential, which maximum or critical potential is sufficient to apply a conducting potential to the grid of valve V7. Preferably and as is diagrammatically indicated in Fig. 2, the phase shifting elements 34 and 36 are so adjusted, in relation to the other electrical quantities in the grid circuit of valve V7, that the just-mentioned critical potential of transformer T4 is developed at a point which coincides with the hypothetical zero point of the welding load current in phase A. It will be understood, of course, that by reason of the inductive character of the welding load, the welding load current in phase A lags rather substantially behind the voltage across phase A. The successive applications of the conducting potential to the grid of valve V7 are, however, without effect so long as the starting control switch S is maintained in the open position, since this switch interrupts the energizing circuit for the plate transformer T7 associated with valve V7.

Assuming it is desired to perform a welding operation, the switch S may be closed, and it will be appreciated that closure of switch S may be effected either manually or automatically. For example, switch S may correspond to the contact members $a$ of the switch, designated WC in the copending application of Cletus J. Collom, Serial No. 358,473, filed September 26, 1940, and assigned to the Weltronic Corporation, and the energization of the operating winding for switch S may be effected in the manner disclosed in the just-mentioned copending application.

Closure of the switch S immediately energizes the transformer T7, the energizing polarities being such that transformer T7 renders the plate of valve V7 positive with respect to the cathode thereof during half cycles in which the anode of rectifier 22 is positive with respect to the cathode thereof. For the purposes of the present decription, such half cycles in which the anodes of rectifiers 22, 24 and 26 are positive may be referred to as the positive half cycles and the term negative half cycles may be used to refer to those half cycles in which the anodes of rectifiers 28, 30 and 32 are positive with respect to the cathodes thereof. At a predetermined point ($t1$, Fig. 2) in the next positive half cycle of phase A following the half cycle in which switch S is closed, transformer T4 develops its critical potential and applies a conducting potential to the grid of valve V7 and this point, as previously mentioned, preferably coincides with the hypothetical zero point of the load current in phase A. At the time in question, the voltage of transformer T7, which is in phase with the voltage of phase A, is high enough to pass current through valve V7.

Upon the application of the just-mentioned critical potential, accordingly, valve V7 is rendered conducting, enabling transformer T7 to establish a potential across the resistor R, which is included in the plate circuit of valve V7. This potential across resistor R is in phase with the voltage of phase A, and at the time in question ($t1$, Fig. 2) is high enough to overcome the negative bias normally applied to the grid of valve V1 by the biasing means DC1 and render valve V1 conducting. As soon as valve V1 is rendered conducting, phase A is enabled to apply an igniting potential between the igniter $i$ and the cathode $c$ of rectifier 22 and render the same conducting, and this action occurs, as aforesaid, at the zero point of the positive half cycle of load current in phase A. Upon being rendered conducting, rectifier 22 conducts current from one terminal of phase A through rectifier 22 and thence through the primary winding 18 of the welding transformer to the other terminal of phase A. As will be appreciated, the energization of the welding transformer WT initiates a flow of current through the work.

Upon being rendered conducting, valve V7 also enables transformer T7 to deliver charging current to the blocking condenser C7 through a circuit which includes the auxiliary rectifier V14. Condenser C7 is preferably proportioned so that it receives the full charge in a relatively small fraction of the positive half cycle in question, and as condenser C7 approaches its full charge, the potential applied thereby to the discharge tube V15 breaks down the latter and renders it conducting, thereby applying a strong negative bias to the grid of valve V7. This action does not interfere with the flow of current through valve V7 during the balance of the half cycle in question, but it does prevent valve V7 from being again rendered conducting until such time as condenser C7 has completely discharged itself through the local discharge circuit provided therefor and including the resistor R1. The timing out of such condenser C1, as described below, makes possible the initiation of the next successive positive impulse of current delivered to the welding circuit.

The potential across the resistor R, which exists during the time that valve V7 is in a conducting condition, applies a corresponding potential to the primary winding of the sequence transformer T14, associated with valve V8, which transformer is consequently rendered effective to overcome the negative bias normally applied to the grid of valve V8 by the biasing means DC8 associated therewith. As will be noted from Fig. 2, current and voltage conditions in phase A are displaced 60 electrical degrees in advance of the corresponding conditions in phase B, and at the time transformer T8 renders the plate of valve V8 positive, the voltage of transformer T14 is still high enough to apply a conducting potential to the grid of valve V8. Consequently, at the time corresponding to the zero point of the voltage in phase B, valve V8 becomes conducting. In response to this action, transformer T8 is enabled to energize transformer T20, the voltage whereof builds in phase with the voltage of phase B, and, at the zero point of the load current in phase B, transformer T20 overcomes the negative grid bias normally applied to the grid of valve V2 by the biasing means DC2.

The last-mentioned action fires valve V2, which thereupon fires the rectifier 24, associated with phase B, in the manner previously described in connection with the firing of rectifier 22. This firing action of rectifier 24 occurs 60 electrical degrees after the firing of rectifier 22, as will be understood, and throughout the balance of the positive half cycle of current in phase A, the welding transformer WT is supplied with current of a value equal to the vectorial sum of the currents flowing in phases A and B.

The conductivity of valve V8 also enables the transformer T8 to energize the sequence transformer T15, associated with the grid of valve V9. As will be understood from the description of the firing of valve V8, transformers T15 and T9 cooperate to fire valve V9 at the zero point of voltage in phase C. This action energizes transformer T21 through valve V9 which, in turn, energizes transformer T21 and thereby overcomes the negative grid bias normally applied by the biasing means DC3 and fires the valve V3. Valve V3, in turn, fires the rectifier 26, associated with phase C, which firing action occurs 60 electrical degrees after the firing of rectifier 24.

At the conclusion of the positive half cycle of phase A, rectifier 22 ceases to pass current and remains non-conducting until the beginning of a succeeding positive half cycle of current flow in phase A, in which the firing valve V1 is again fired. As hereinafter described, this next firing of valve V1 occurs at the time represented by the vertical line T3 in Fig. 2, which time is displaced 1080 electrical degrees after the initial firing thereof. Similarly, at the conclusion of the positive half cycle of phase B, rectifier 24 ceases to pass current and remains non-conducting until a time spaced 1080 electrical degrees from the initial firing thereof. At the conclusion of the positive half cycle of phase C, also, rectifier 26 ceases to pass current and remains non-conducting for a corresponding interval. The single firing of each of rectifiers 22, 24 and 26 consequently passes through the welding transformer an impulse of current 300 electrical degrees in duration and the value of which is equal to the vectoral sum of the currents flowing in the individual phases A, B and C. This impulse of current may be referred to as a positive impulse of welding current.

The conductivity of valve V9, in addition to firing the rectifier 26, also enables the transformer T9 to energize the transformer T16, and the potential developed by transformer T16 is consequently applied to the grid of valve V13. The connections for transformer T16 are, however, such that the potential so built up is additive with respect to the biasing means DC10. At the conclusion of the positive half cycle of current flow through transformer T9 and valve V9, the latter becomes non-conducting, at which time the flux in transformer T16 is of a maximum value. The consequent rapid decay of such flux develops a momentary high opposite voltage in transformer T16. This voltage is initiated at approximately the vertical line marked T16 in Fig. 2, since the power factor of the circuit, including transformer T9, may be expected to be somewhat higher than that of the welding load circuit, and this voltage of the transformer, which overcomes the biasing means DC13, persists until after transformer T1 has rendered the plate of valve V13 positive. Valve V13 thus conducts current during the positive half cycle of phase A following the half cycle in which rectifier 22 conducts current. This action enables the transformer T13 to energize the transformer T17, which initially builds up a voltage which is additive with respect to the voltage of the biasing means DC10, associated with valve V10. At the conclusion of the just-mentioned positive half cycle of current flow in valve V13, this valve becomes non-conducting. The circuits including valve V13 and transformers T9 and T10 are less highly inductive than the load circuit for phase B. Consequently, valve V13 becomes non-conducting slightly prior to the point designated t2 in Fig. 2. The interruption of current flow through valve V13 causes a rapid decay of flux in transformer T17 and develops a high momentary reverse voltage therein, which overcomes the biasing means DC10. At the time t2 (Fig. 2), transformer T10, which is reversely connected as compared to transformer T7, maintains the plate of valve V10 positive. Transformer T17 is still effective at the time t2, and consequently, at such time, valve V10 is rendered conducting and impresses the voltage of transformer T10 upon transformer T22, which fires valve V4. Valve V4, in turn, fires rectifier 28, thereby initiating a negative impulse of welding current. At the time t2, the voltage of transformer T22, which is in phase with the voltage of phase A, is high enough to overcome the biasing means DC4, and consequently, the firing of rectifier 28 occurs at the zero point of negative load current wave in phase A. The circuits by which valves V5 and V6 are fired, so as to correspondingly fire the main rectifiers 30 and 32, associated with phases B and C, duplicate the corresponding circuits associated with valves V2 and V3, previously described, it being noted that the connections for transformers T11 and T12 are the reverse of those for transformers T8 and T9, so that transformers T11 and T12 are effective during negative half cycles of the corresponding phases.

As will be appreciated, the termination of the negative half cycle of current flow in phase C terminates the negative impulse of welding current initiated at the time t2 in Fig. 2. In continuous operation, the next positive impulse of load current is initiated at the time t3 in Fig. 2, which corresponds to time t1, but is displaced 1080 electrical degrees therefrom. It will be noticed that phase A passes through two positive half cycles in the interval between the conclusion of the above described positive impulse of load current and the time t3. The blocking condenser C7, however, functions to maintain valve V7 in a non-conducting condition and prevents the firing of rectifier 22 during the just-mentioned two positive half cycles. As previously mentioned, the peaking transformer T4 develops its critical potential at a time which coincides with the beginning of the positive half cycle of current flow in phase A. Consequently, condenser C7 may time out at any time in the interval between the vertical lines designated t4 and t3 in Fig. 2. This is for the reason that if valve V7 is blocked by condenser C7, at the time represented by the line t4, the critical potential developed at such time by transformer T4 is ineffective to fire valve V7. Transformer T4 again develops a critical potential at a time displaced 180 electrical degrees from the time t4. This potential, however, is ineffective since at the time in question the plate of valve V7 is negative. Consequently, having passed the time t4, it is only necessary that condenser C7 time out before the time t3 is reached. In order to allow for some variations in timing, it is preferred to adjust condenser C7, so that it times out at approximately the time represented by the line t5, so that a variation in the timing thereof in either direction of approximately a full half cycle does not alter the operation of the system.

It will be understood, therefore, that when valve V7 is initially fired, it charges condenser C7, which thereupon blocks valve V7 and enables condenser C7 to start discharging through the obvious local circuit associated therewith, which includes the variable resistor R1. As soon as the energy of condenser C7 is dissipated to a predetermined degree, however, valve V7 again becomes subject to the action of transformer T4 and consequently, if the starting switch S is still closed at the time t3, another complete cycle, comprising a pair of respectively opposite impulses of load current, is initiated, all as described above. Thus, so long as the starting switch S is maintained closed, alternately opposite impulses of load current are continuously supplied to the welding transformer WT. Also, it is believed to be evident that the opening of switch S may occur substantially instantaneously after the firing of valve V7, since transformer T7 is required to be energized only long enough to fire valve V7 and maintain transformer T14 energized long enough to fire valve V8. Thereafter, each full load cycle is fully automatic. Each closure of switch S thus delivers to the work circuit one or more full cycles of load current.

Although only one specific embodiment of the invention has been described in detail, it will be appreciated that various modifications in the form, number and arrangement of parts may be made without departing from the spirit and scope of the invention.

What is claimed is:

1. In a timing control system for a plurality of translating means for association with a source of power which delivers a succession of cyclical impulses of alternately opposite polarity, valve means individual to each of said translating means, means for actuating one of said valve means so as to effect an operation of the corresponding translating means for delivering an impulse of one polarity, means operated as a consequence of the operation of said one valve means for actuating another of said valve means, said last valve means operating the corresponding translating means for delivering an impulse of the opposite polarity at least a cycle and one-half after the delivery of said first impulse, and means for causing the operation of said translating means to occur during respectively spaced opposite pulsations of said source at least a cycle and one-half from each such operation.

2. In a timing control system for a plurality of translating means for association with a source of power which delivers a succession of cyclical impulses of alternately opposite polarity, one said translating means corresponding to impulses of one polarity and another said translating means corresponding to impulses of opposite polarity, valve means individual to each of said translating means, means for actuating one of said valve means so as to effect an operation of the corresponding translating means for delivering an impulse of one polarity, and means operated as a consequence of the operation of said one valve means for actuating another of said valve means, said last valve means operating the corresponding translating means for delivering an impulse of the opposite polarity at least a cycle and a half after delivery of said first impulse.

3. In a timing control system for association with a multiphase alternating current source, the combination of a plurality of translating means, one said translating means being individual to each said phase and to each half cycle of said phase, valve means individual to each of said translating means, means for actuating one of said valve means so as to effect an operation of the corresponding translating means, and means operated as a consequence of the operation of said one valve means for actuating the remaining ones of said valve means.

4. In a timing control system for association with a multiphase alternating current source, the combination of a plurality of translating means, one said translating means being individual to each said phase and to each half cycle of said phase, valve means individual to each of said translating means, means for actuating the valve means corresponding to the half cycles of like polarity of the several phases, and means operated as a consequence of the operation of said last-mentioned valve means for actuating the remaining ones of said valve means.

5. In a timing control system for association with a multiphase alternating current source, the combination of a plurality of translating means, one said translating means being individual to each said phase and to each half cycle of said phase, valve means individual to each of said translating means, means for actuating one of said valve means so as to effect an operation of the corresponding translating means, means operated as a consequence of the operation of said one valve means for actuating the remaining ones of said valve means, and means for preventing re-operation of said one valve means for a predetermined interval after the operation thereof.

6. In a timing control system for association with a multiphase alternating current source, the combination of a plurality of translating means, one said translating means being individual to each said phase and to each half cycle of said phase, valve means individual to each of said translating means, means for actuating one of said valve means so as to effect an operation of the corresponding translating means, means operated as a consequence of the operation of said one valve means for actuating the remaining ones of said valve means, and means for preventing re-operation of said one valve means for a predetermined interval after the operation thereof, said one valve means being effective after the timing out of said preventing means to initiate a further sequential operation of said series of valve means.

7. In a timing control system for association with a multiphase alternating current source, the combination of a plurality of translating means, one said translating means being individual to each said phase and to each half cycle of said phase, valve means individual to each of said translating means, means for actuating one of said valve means so as to effect an operation of the corresponding translating means, means operated as a consequence of the operation of said one valve means for actuating the remaining ones of said valve means, and means for preventing re-operation of said one valve means for a predetermined interval after the operation thereof, said preventing means being effective to delay said re-operation for an interval such that successive operations of said one valve means are spaced in excess of 360 electrical degrees.

8. In a control system for association with a multiphase alternating current source, a pair of reversely connected rectifiers individual to each phase and operable respectively to transmit current during opposite half cycles of such phase, said pairs of rectifiers being connected to translate power from said source into a succession of impulses of alternately opposite polarity, each impulse representing the vectorial sum of impulses of like polarity of the individual phases, valve means individual to each rectifier for rendering the same conducting, and sequencing means for first actuating the valve means associated with the rectifiers of a half cycle of one polarity of said source and for thereafter actuating the valve means associated with the rectifiers corresponding to the opposite half cycles of said source.

9. In a control system for association with a multiphase alternating current source, a pair of reversely connected rectifiers individual to each phase and operable respectively to transmit current during opposite half cycles of such phase, said pairs of rectifiers being connected to translate power from said source into a succession of impulses of alternately opposite polarity, each impulse representing the vectorial sum of impulses of like polarity of the individual phases, valve means individual to each rectifier for rendering the same conducting, sequencing means for first actuating the valve means associated with the rectifiers of a half cycle of one polarity of said source and for thereafter actuating the valve means associated with the rectifiers corresponding to the opposite half cycles of said source, starting means for actuating the operation of the first valve means of the series, and said sequence means serving to cause the remainder of the valve means to operate in sequence as a consequence of the operation of said one valve means.

10. In a control system for association with a multiphase alternating current source, a pair of reversely connected rectifiers individual to each phase and operable respectively to transmit current during opposite half cycles of such phase, said pairs of rectifiers being connected to translate power from said source into a succession of impulses of alternately opposite polarity, each impulse representing the vectorial sum of impulses of like polarity of the individual phases, valve means individual to each rectifier for rendering the same conducting, and sequencing means for first actuating the valve means associated with the rectifiers of a half cycle of one polarity of said source and for thereafter actuating the valve means associated with the rectifiers corresponding to the opposite half cycles of said source, the rectifiers corresponding to said opposite half cycles of the source being operated in the same order as said rectifiers corresponding to the half cycles of said one polarity.

11. In a control system for association with a multiphase alternating current source, a pair of reversely connected rectifiers individual to each phase and operable respectively to transmit current during opposite half cycles of such phase, said pairs of rectifiers being connected to translate power from said source into a succession of impulses of alternately opposite polarity, each impulse representing the vectorial sum of impulses of like polarity of the individual phases, valve means individual to each rectifier for controlling the conductivity of the same, and sequencing means for said valve means operable to actuate the same so as to sequentially cause conduction through the rectifiers associated with half cycles of the source of one polarity and for thereafter causing conducting through the rectifiers corresponding to the opposite half cycles of the source.

12. In a control system for a work circuit associated with a multiphase alternating current supply source, the several phases whereof are displaced but overlap as to time, the combination of means electrically connecting said phases to said work circuit so that said work circuit receives the combined current outputs of said phases as a succession of impulses of alternately opposite polarity, each said impulse being a summation of current components of like polarity supplied by the individual phases, said means including means individual to each said phase for controlling current flow in the corresponding phase, and means for operating said individual means in succession.

13. In a control system for a work circuit associated with a multiphase alternating current supply source, the several phases whereof are displaced but overlap as to time, the combination of means electrically connecting said phases to said work circuit so that said work circuit receives the combined current outputs of said phases as a succession of impulses of alternately opposite polarity, each said impulse being a summation of current components of like polarity supplied by the individual phases, said means including electric valve means individual to each said phase, and means for altering the conductivity of said valve means in predetermined succession.

14. In a control system for a work circuit associated with a multiphase alternating current supply source, the several phases whereof are displaced but overlap as to time, the combination of means electrically connecting said phases to said work circuit so that said work circuit receives the combined current outputs of said phases as a succession of impulses of alternately opposite polarity, each said impulse being a summation of current components of like polarity supplied by the individual phases, said means including a pair of reversely connected electric valve means individual to each said phase, the first valve of each pair being disposed to conduct current during half cycles of one polarity and the second valve of each pair being disposed to conduct current during half cycles of the opposite polarity, and means for successively actuating the first valves of all of the pairs and for thereafter successively actuating the second valves of all of the pairs.

15. In a control system for a work circuit associated with a multiphase alternating current supply source, the several phases whereof are displaced but overlap as to time, the combination of means electrically connecting said phases to said work circuit so that said work circuit receives the combined current outputs of said phases as a succession of impulses of alternately opposite polarity, each said impulse being a summation of current components of like polarity supplied by the individual phases, said means including a pair of reversely connected electric valve means individual to each said phase, the first valve of each pair being disposed to conduct current during half cycles of one polarity and the second valve of each pair being disposed to conduct current during half cycles of the opposite polarity, and means for successively actuating the first valves of all of the pairs and for thereafter successively actuating the second valves of all of the pairs, the said second valves being operated in the same order as said first valves.

GUSTAV E. UNDY.